No. 886,151. PATENTED APR. 28, 1908.
O. K. OLSON.
NEST FOR POULTRY.
APPLICATION FILED JUNE 20, 1907.
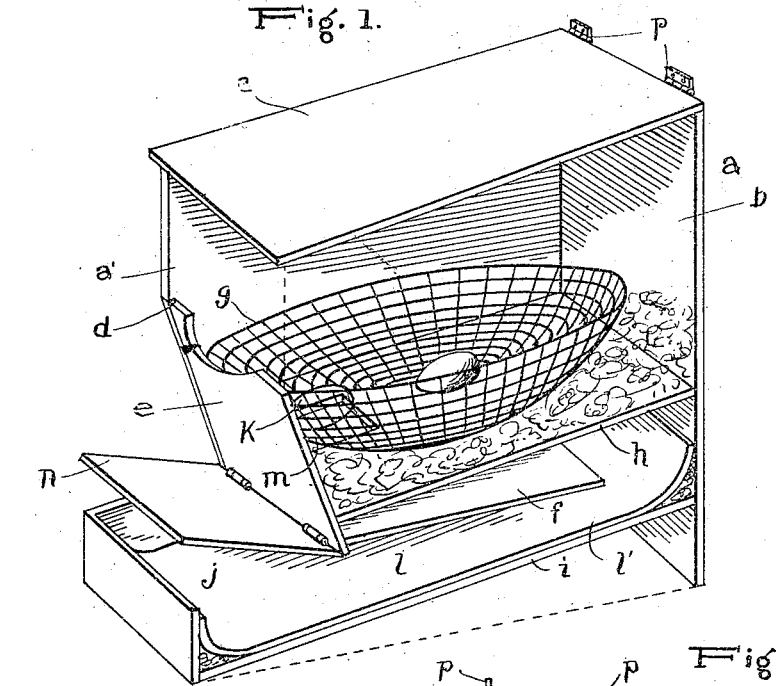
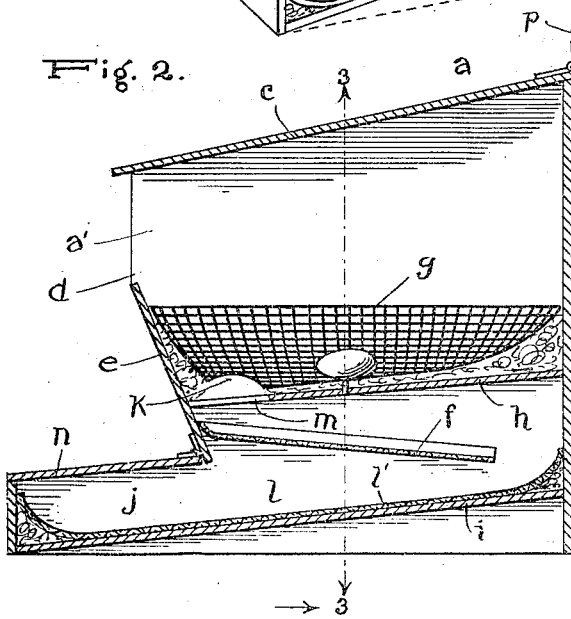
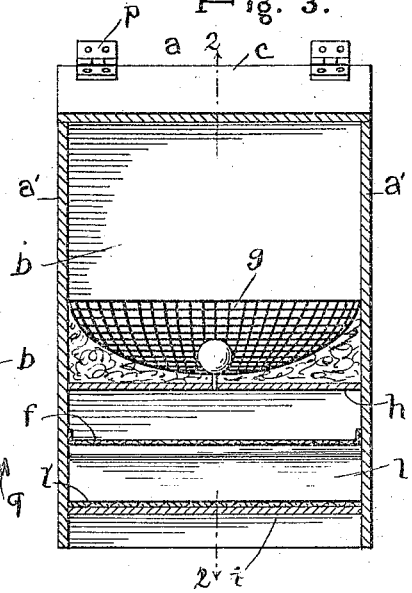
Witnesses
Stuart Hilder
George M. Anderson
Inventor
Ole K. Olson
By E. W. Anderson
his Attorney

UNITED STATES PATENT OFFICE.

OLE K. OLSON, OF CLIFFORD, NORTH DAKOTA.

NEST FOR POULTRY.

No. 886,151.　　　Specification of Letters Patent.　　　Patented April 28, 1908.

Application filed June 20, 1907. Serial No. 379,947.

*To all whom it may concern:*

Be it known that I, OLE K. OLSON, a citizen of the United States, resident of Clifford, in the county of Traill and State of North Dakota, have made a certain new and useful Invention in Nests for Poultry; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention partly broken away. Fig. 2 is a section on the line 2—2 Fig. 3. Fig. 3 is a section on the line 3—3 Fig. 2.

The invention has relation to nests for poultry, and it consists in the novel construction and combinations of parts as hereinafter set forth.

The object of the invention is to provide a nest which is easily accessible and is also of such comfortable character as to be acceptable to the hen, and which provides means for obviating deterioration of the eggs, and for protecting the same from casual accident.

In the accompanying drawings illustrating the invention, the letter $a$, designates the housing for the nest, having side walls $a'$, having forward extensions $a^2$, at their lower portions, a rear wall $b$, and an inclined top or cover $c$. This housing is open at its upper front portion as indicated at $d$, to provide an entrance for the fowl. Below this entrance opening and above the forward extensions $a^2$, of the side walls a partial front wall is provided at $e$, such wall having a rearward inclination from top to bottom.

The nest $g$, is preferably formed of screen cloth of concave form. The bottom of the nest has a downward and forward inclination of slight grade, and is separated by an interval from the bottom board $h$, of the nest chamber of the housing, such bottom board $h$, having an inclination similar to that of the bottom of the nest, and intersecting the partial front wall $e$, near the lower portion thereof. Excelsior or other suitable cushioning material is placed between the nest and the bottom board $h$, of the nest chamber, and between the nest and the front wall and the back of the housing, as also around the nest at the sides, between the same and the side walls of the housing.

Below the bottom board $h$, of the nest chamber and separated therefrom by a suitable interval is a downward and rearward inclined egg conveyer or cloth strip of slight grade, leading to the bottom board $i$, of a passage chamber $l$, for the eggs, such board $i$, having a gradual downward and forward inclination and having an egg receiving front extension $j$, the side walls of the housing being also extended forward at their lower portions to provide for this egg receiving extension.

The cloth strip which is indicated at $f$, is attached at its front end to the partial front wall of the housing, and terminates at its rear end short of the rear wall of the housing to leave an opening for passage of the eggs.

The bottom board $i$, has a suitable cushioning covering $l'$, preferably of cloth, which is curved or inclined upward at both end portions thereof away from such bottom board, excelsior or the like being placed between the cloth covering and the bottom board at such end portions.

An opening $k$, is provided in the screen cloth of the nest at the forward end thereof for exit of the egg therefrom, such egg being caused to roll slowly down the gradual incline of the nest bottom and falling through such opening of the nest and through a registering opening in the bottom of the nest chamber, indicated at $m$. The egg is received in its fall by the cloth conveyer strip $f$, rolling therealong and dropping therefrom upon the upward curved cushioned covering of the bottom board $i$, at the rear end of the housing, and rolling slowly down the passage chamber $l$, upon the cloth covering of the bottom board thereof until it arrives at the foot of such board in the egg receiving or collecting chamber, such foot being suitably cushioned as before described.

A hinged cover $n$, is provided for the egg receiving front extension $j$ of the egg passage chamber $l$, this cover serving also as a step for the hen in entering the nest.

The inclined front wall $e$, of the nest chamber is cut away a little at the top to the level of the nest, thus facilitating the entrance of the hen.

Hinges $p$ are provided at the rear for suspension of the nest from a suitable support, a spring $q$, being attached to the housing at the back and located between such housing and the wall support, acting to prevent rigidity of the nest and avoiding injurious shocks.

Having thus described my invention, what

I claim as new and desire to secure by Letters Patent is:

A nest for poultry including a housing having side walls provided with forward extensions at their lower portions, a rear wall, a forward and downward inclined top wall, a downward and rearward inclined partial front wall connecting said side walls above the forward extensions thereof and below said top wall, whereby an entrance opening is provided, a bottom board for the nest proper having a downward and forward inclination and intersecting said partial front wall near the lower portion thereof, a nest above said bottom board having a similar inclination thereto, such nest and bottom board having registering openings at the forward end portions thereof for passage of eggs, a downward and rearward inclined cloth strip under the nest proper connected at its front end to the partial front wall and terminating at its rear end short of the rear wall of the housing, to leave an interval for passage of the eggs, said housing having a bottom chamber provided with a downward and forward inclined bottom wall having an up-curved cushioned upper end and an egg receiving forward extension having an up-curved cushioned lower end, and a hinged cover.

In testimony whereof I affix my signature, in presence of two witnesses.

OLE K. OLSON.

Witnesses:
H. N. HANSON,
H. N. KLEO.